(No Model.)
L. BITZER, Jr.
EYEGLASSES.
No. 344,618. Patented June 29, 1886.
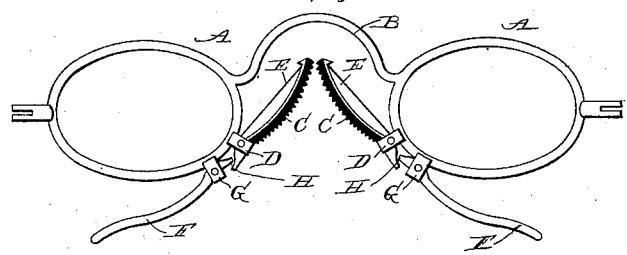
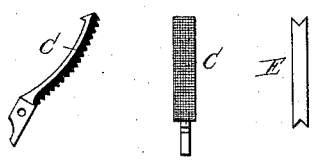
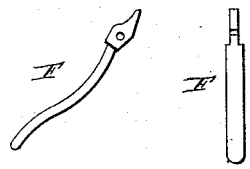
Witnesses:
Inventor:
Louis Bitzer Jr.

UNITED STATES PATENT OFFICE.

LOUIS BITZER, JR., OF MONTAGUE, MASSACHUSETTS.

EYEGLASSES.

SPECIFICATION forming part of Letters Patent No. 344,618, dated June 29, 1886.

Application filed February 10, 1886. Serial No. 191,392. (No model.)

*To all whom it may concern:*

Be it known that I, LOUIS BITZER, Jr., a citizen of the United States of America, residing at Montague, in the county of Franklin and State of Massachusetts, have invented certain new and useful Improvements in Eyeglasses and Spectacles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of my invention is to have a contrivance so constructed that it will hold firmly upon the nose that class of eyeglasses and spectacles which have a solid or non-elastic connection between the eyes or frames, as in the case of the common spectacles having bows, and my invention is rendered more effective by the use of such a solid or non-elastic connection than is the case with the common eyeglasses which have spring connections; and the invention consists in the combination and arrangement of the parts, substantially as hereinafter fully set forth, and particularly pointed out in the claims.

In the accompanying drawings, Figure 1 is a view in side elevation of a pair of eyeglasses embodying my invention, and Figs. 2 and 3 embody detail views thereof.

In the drawings, A A indicate the frame, and B the solid or non-elastic connection of said frame A A.

C C indicate the two nose-pieces, which are pivoted to the clips D D, said clips D D being attached in a suitable manner to the frame A A, the inside of said nose-pieces being roughened or serrated in the usual manner, so as to retain a firm hold upon the nose of the wearer.

E E indicate the two springs which hold the aforesaid nose-pieces C in their normal position, the upper ends thereof nearly meeting, thereby firmly pressing said nose-pieces upon the nose of the wearer. Said springs are attached to the clips D D by means of a small nick being cut in the end thereof, and in the same manner to the upper ends of the nose-pieces, as can be more fully seen in Fig. 2.

F F indicate two levers, which are pivoted to the clips G G, said clips being attached in a suitable manner to the frame A A. It will be seen that by pressing upward upon said levers the nose-pieces C C are, by reason of contact of the said levers with the said nose-pieces at H H, forced outwardly or away from the nose; but when said levers are released from said upward pressure the springs E E force both the nose-pieces and the levers back to their original place, thereby setting the glasses firmly upon the nose of the wearer.

Fig. 2 shows, respectively, a side and end view of the nose-pieces and a side view of one of the springs. Fig. 3 shows a side and end view of the levers F F.

Having thus described my invention, what I claim as new, and desire to secure by Letters Patent, is—

1. A pair of eyeglasses consisting of the frame having the non-elastic connection, the nose-pieces pivoted thereto, the springs acting on said nose-pieces, and the levers, also pivoted to said frame and actuating said nose-pieces, substantially as shown and described.

2. The combination, with the pivoted nose-pieces and the springs, of the levers having contact with the ends of said nose-pieces, substantially as shown and described.

3. In a pair of eyeglasses, the combination, with the frame having the non-elastic connection and the pivoted nose-pieces, of the levers pivoted to said frame, and having contact with the ends of said nose-pieces, substantially as shown and described.

In testimony whereof I affix my signature in presence of two witnesses.

LOUIS BITZER, JR.

Witnesses:
 JOHN BITZER,
 GEO. A. EMBURY.